(12) United States Patent
Zhang (10) Patent No.: US 7,628,252 B2
(45) Date of Patent: Dec. 8, 2009

(54) DRUM BRAKE APPARATUSES (75) Inventor: Ping Zhang, Shanghai (CN)

(73) Assignee: BYD Company Limited, Shenzhen (CN)

( * ) Notice: Subject to any disclaimer, the term of this patent is extended or adjusted under 35 U.S.C. 154(b) by 149 days.

(21) Appl. No.: 11/505,060

(22) Filed: Aug. 15, 2006

(65) Prior Publication Data

US 2007/0034460 A1 Feb. 15, 2007

(30) Foreign Application Priority Data

Aug. 15, 2005 (CN) .................... 2005 2 0103848 U (51) Int. Cl.
*F16D 55/18* (2006.01)
*F16D 65/00* (2006.01)

(52) U.S. Cl. ................. 188/72.4; 188/72.1; 188/151 R; 188/218 R (58) Field of Classification Search ................ 188/72.2, 188/72.7, 78, 325, 218 R, 264 R, 264 B, 188/264 D, 72.1, 72.4, 151 R, 352
See application file for complete search history.

(56) References Cited

U.S. PATENT DOCUMENTS

| 2,300,532 | A | * | 11/1942 | Ash | 188/18 A |
|---|---|---|---|---|---|
| 2,305,822 | A | * | 12/1942 | Wittner | 188/185 |
| 2,703,155 | A | * | 3/1955 | Simpson | 188/77 R |
| 3,043,155 | A | * | 7/1962 | Salna | 74/391 |
| 3,399,749 | A | * | 9/1968 | Baule | 188/259 |
| 4,408,746 | A | * | 10/1983 | Marsch et al. | 254/344 |
| 4,645,046 | A | * | 2/1987 | Takano et al. | 192/219.5 |

* cited by examiner

*Primary Examiner*—Melody M Burch
(74) *Attorney, Agent, or Firm*—Venture Pacific Law, PC (57) ABSTRACT

A type of drum brake for automobiles that is comprised of a brake drum, one or more brake shoes, and one or more brake cylinders. Its special characteristics are: the drum brake further comprises an ordinary gear train which comprises an annulus, one or more planetary gears and a sun gear. Here, the annulus is attached to the brake drum. The sun gear and a mounting shell of the brake shoes are attached to each other. The planetary gears are located between the annulus and the sun gear, and one or more planetary gear axles of the respective planetary gears are affixed with one or more planetary carriers. By adopting the drum brake of this invention and the ordinary gear train, when the brake is applied, the brake shoes rotate in the opposite direction relative to the moving direction of the brake drum, thereby greatly reduce the braking distance and braking time.

8 Claims, 6 Drawing Sheets

DRUM BRAKE APPARATUSES

CROSS REFERENCE

This application claims priority from a Chinese patent application entitled "Drum Brakes for Automobiles" filed on Aug. 15, 2005, having a Chinese Application No 200520103848.3. This application is incorporated herein by reference.

FIELD OF INVENTION

This invention relates to brakes, and especially related to drum brakes for automobiles.

BACKGROUND

A drum brake for automobiles is a component of the braking system which generates the braking force. Currently, a brake used in a typical automobile generates a brake moment by the friction between the fixed component and the rotating component, i.e., a friction-type brake. Brakes which expand by using a hydraulic cylinder are divided into drum brakes and disc brakes.

The rotating component of the frictional pair of a drum brake is the brake drum. The operating surface of the brake drum is an inner cylinder surface. The affixed component is a brake shoe. The brake shoe expands when it is driven by a braking cylinder which is controlled by a hydraulic mechanism. The different structures and operating characteristics of these drum brakes expanded by braking cylinders can be further categorized into the following types: leading-trailing shoe brakes, double-leading shoe brakes, double-trailing shoe brakes, double acting leading shoe brakes, and self-servo brakes.

Figure 1:
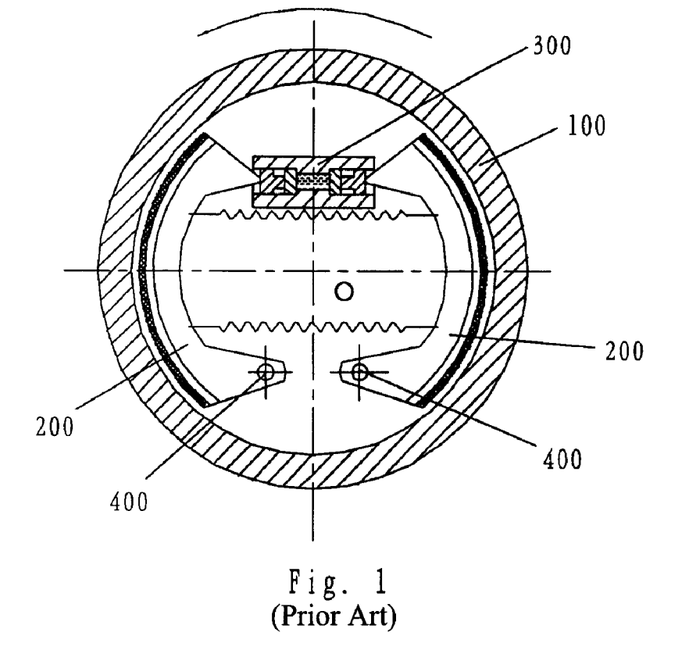
FIGS. 1-6 are illustrations of prior art brakes.

FIG. 1 shows a leading-trailing shoe brake, comprising a brake drum 100, two symmetry brake shoes 200 and a double-piston braking cylinder 300. Here, the outer surface of the brake shoes is riveted with friction pads. The end of each brake shoe is supported by an anchor pin 400. When the brake is applied, the two brake shoes are driven by the hydraulic cylinder of a double-piston braking cylinder. The brake shoes expand and turn outwards on the anchor pin which is the pivot point and press on the rotating brake drums. A frictional moment (i.e., a brake moment) is created between the brake shoes and the brake drum. The direction of friction moment is opposite to the direction of rotation of the wheels, thereby creating a braking effect. To remove the braking effect, the hydraulic pressure of the hydraulic braking cylinder is released, and the brake shoes return to their original positions under the force of the return spring.

As the automobile is moving, the direction of the rotation of the brake drum is as shown by the arrow in FIG. 1. When the brake is applied, the two brake shoes turn to expand outwards on each anchor pin as the pivot point. The turning direction of the first brake shoe is opposite to the direction of rotation of the brake drum thus it is called the leading shoe. The turning direction of the second shoe is identical to the direction of rotation of the brake drum thus it is called the trailing shoe. When the automobile is backing up, the first brake shoe becomes the trailing shoe and the second brake shoe becomes the leading shoe. Since there is always a leading shoe and a trailing shoe when the brake is applied whether it is moving forward or backward, this type of brakes is called leading-trailing shoe brake.

Figure 2:
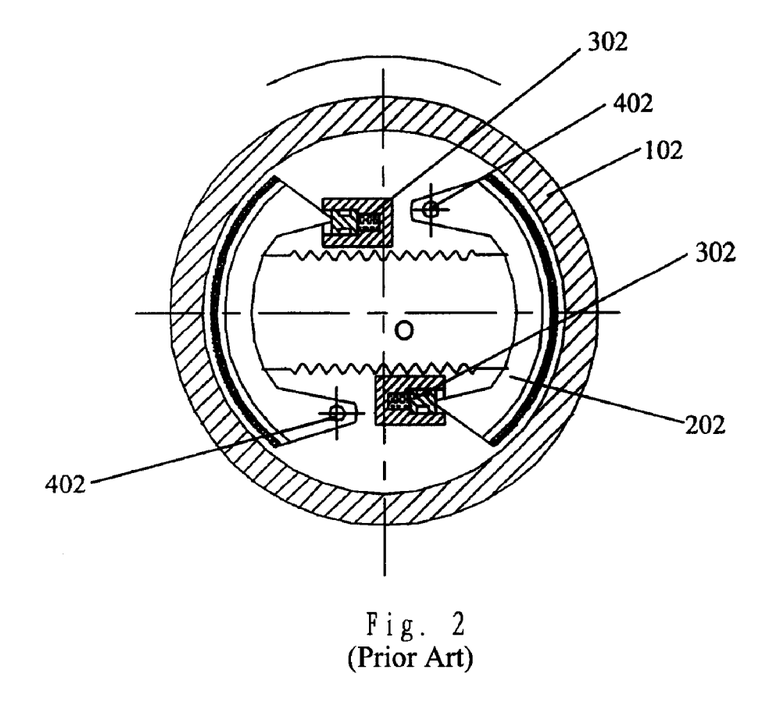

FIG. 2 shows a double-leading shoe brake, comprising a brake drum 102, two brake shoes 202, and two single-piston braking cylinders 302. The end of each brake shoe is supported by an anchor pin 402. The brake is approximately identical to the leading-trailing shoe brake as shown in FIG. 1. The difference lies in that the brake utilizes two single-piston braking cylinders 302 respectively driving two brake shoes 202 to turn and to expand outwards. As the automobile moves forward, both of the brake shoes are leading shoes thus it is called double-leading shoe brake. This type of brakes is effective when the brake is applied as it is moving forward. However, when the automobile backs up, both of the brake shoes become trailing shoes thus the effectiveness is greatly diminished.

Figure 3:
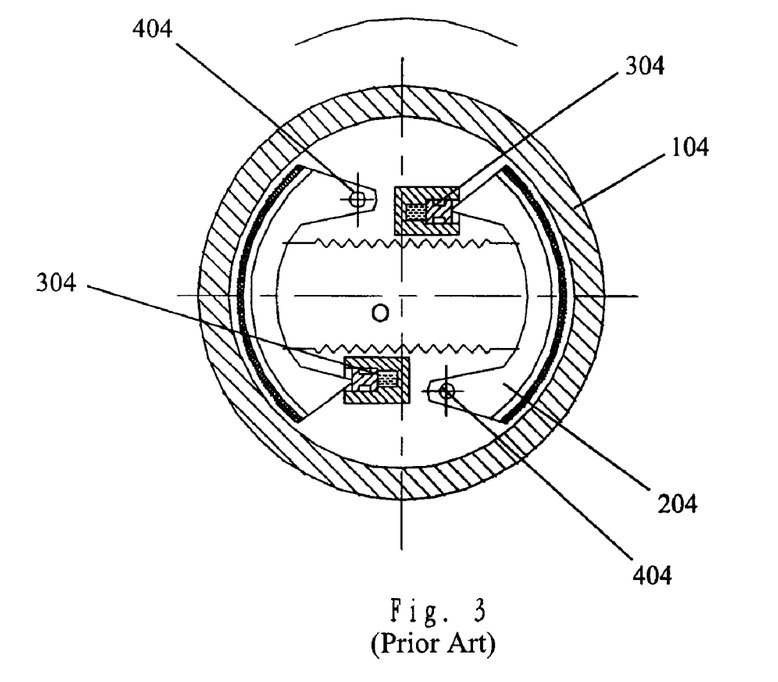

FIG. 3 shows a double-trailing shoe brake, comprising a brake drum 104, two brake shoes 204, and two braking cylinders 304. The end of each brake shoe is supported by an anchor pin 404. Compared to the brake of FIG. 2, the double-trailing show brake of FIG. 3 is created by turning the double-leading shoe brake 180 degrees. Apparently, the braking effect of the double-trailing shoe brake is not as desirable as that of the double-leading shoe brake when the automobile is moving forward. However, the double-trailing shoe brake is less sensitive to the change in the friction factor thus it has good stability in its braking effect.

Figure 4:
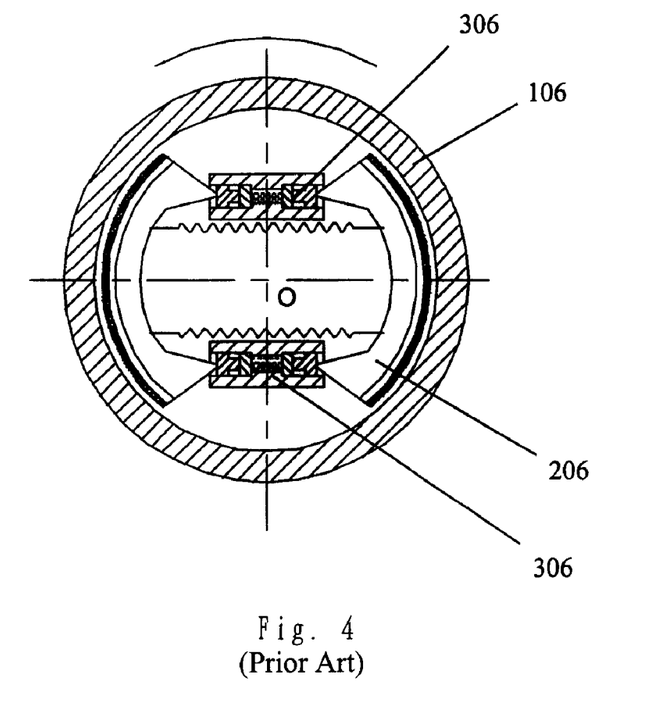

FIG. 4 shows a double acting leading shoe brake. Compared to the leading-trailing shoe brake of FIG. 1, it has an additional braking cylinder opposite to the first braking cylinder. Both ends of both brakes shoes 206 have floating grippers. When the automobile is moving forward, the pistons of both cylinders 306 move outwards under the hydraulic force, thereby pressing the brake shoes against the rotating brake drum 106. Thereafter, under the force of the friction of the brake drum, the two brake shoes turn by a certain degree around the center of the wheel along the direction of the rotation of the brake drum. Thus the pedestal at the outside of the pistons of the cylinders is pushed back until the top of the pedestal reaches the transverse plane of the cylinder. When the automobile backs up, the brake drum exerts a friction moment in the opposition direction on the brake shoes. Thus the adjustable pedestal becomes the anchoring point of the brake shoes, and both of the brake shoes are still leading shoes. Since both of the brake shoes are leading shoes whether the automobile is moving forward or back ward, this type of brake is called double acting leading shoe brake.

Figure 5:
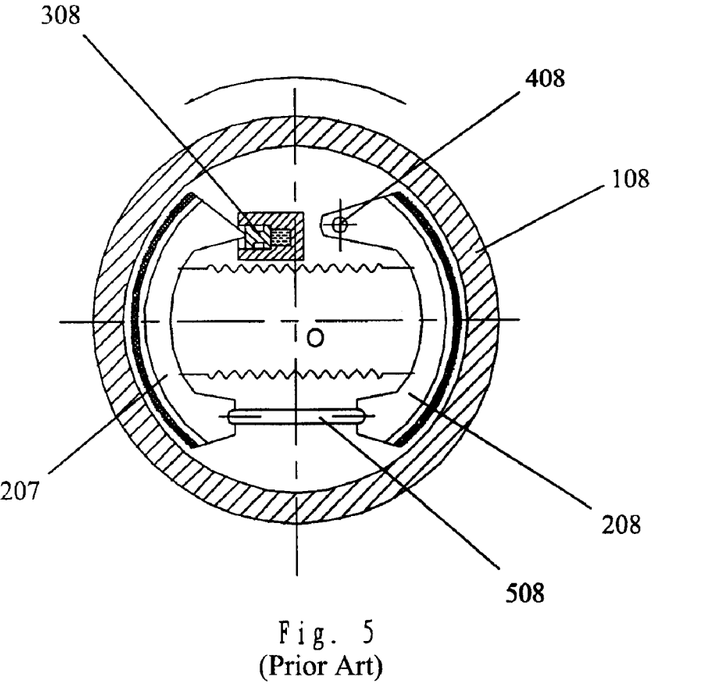

FIG. 5 shows a single-self-servo brake. It utilizes a single-piston driving cylinder 308 to drive the first brake shoe 207. The end of a second brake shoe 208 is supported by an anchor pin 408. The brake shoe is connected to a second brake shoe 208 through an adjustable pole 508. When the brake is applied, the first brake shoe 207 turns to expand outwards under the force of the driving cylinder 308, pressing against the brake drum 108. Meanwhile, through the adjustable pole 508, the first brake shoe 207 affects the second brake shoe 208, making the second brake shoe 208 to also turn to expand outwards and press against the brake drum 108, creating a self-serving force.

Figure 6:
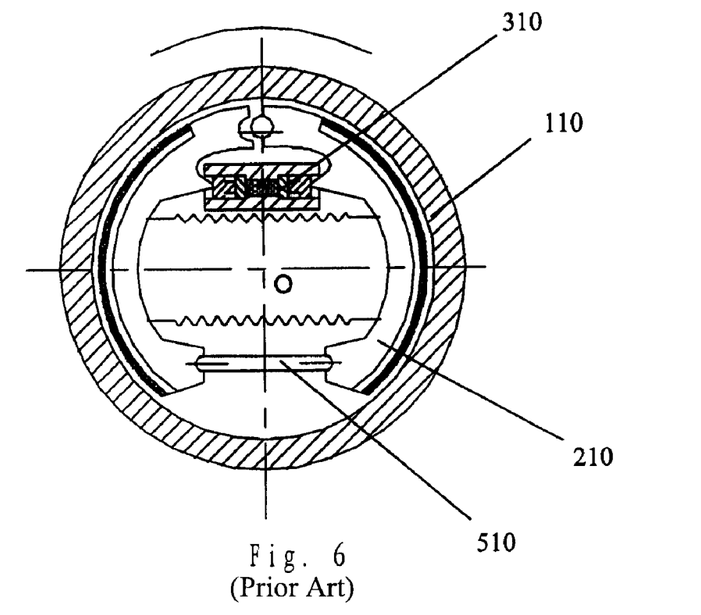

FIG. 6 shoes a double-self-servo brake, comprising a brake drum 110, two brake shoes 210, and a double-piston driving cylinder 310. It utilizes the double-piston driving cylinder 310. The way it operates resembles that of the single-self-servo brake of FIG. 5.

The above is a brief description of the drum brakes for automobiles. The detailed structure of various prior art brakes can be found in various publications on automobile structures, e.g., "Automobile Structure" by Guan Wen-Da (Editor-in-Chief), Tsinghua University Press, September, 2004 (1st Edition).

The above mentioned drum brakes are widely used in various types of automobiles because of their desirable characteristics such as a compact and simple structure, good radiating properties, and easy to be used as parking brakes. Among the drum brakes, the double acting leading shoe brake has the best braking effectiveness since both of the brake shoes are leading shoes when the brake is applied whether it is moving forward or backward. In addition, the brake shoes of a double acting leading shoe brake are worn evenly. Thus the double acting leading shoe brakes are most widely adopted.

However, as the traveling speed of the automobiles generally increases, there is a higher demand on the effectiveness of the drum brakes. In real applications, the effectiveness of various brakes is not very satisfactory. The problems of excessively long braking time and braking distance still remain. Thus, there is a desire to have novel drum brake apparatuses that can provide better braking distance and braking time.

SUMMARY OF THE INVENTION

An object of this invention is to provide novel drum brakes that distinctively improve braking distance.

Another object of this invention is to provide novel drum brakes that distinctively improve braking time.

Yet another object of this invention is to provide novel drum brakes that are simple to operate.

Briefly, the presently preferred embodiment of the present invention provides a drum brake that comprises a brake drum, brake shoes, and braking cylinders. There is an ordinary gear train which comprises an annulus, a planetary gear and a sun gear. The annulus is attached on the brake drum. The sun gear and a mounting shell of the brake shoe are attached to each other. The planetary gear is located between the annulus and the sun gear, and a planetary gear axle of the planetary gear is affixed with a planetary carrier. In operation, when a drum brake of this invention is applied, using the additional ordinary gear train, the drum shoes can turn in the direction opposite to the direction of rotation of the brake drum. Thus the braking effectiveness is greatly enhanced, and the drum brake is superior to the prior art brakes in braking time and distance by a wide margin.

An advantage of this invention is that it provides novel drum brakes that distinctively improve braking distance.

Another advantage of this invention is that it provides novel drum brakes that distinctively improve braking time.

Yet another advantage of this invention is that it provides novel drum brakes that are simple to operate.

DESCRIPTION OF DRAWINGS

The foregoing and other objects, aspects and advantages of the invention will be better understood from the following detailed description of preferred embodiments of this invention when taken in conjunction with the accompanying drawings in which.

INDICATORS OF THE FIGURES

| | |
|---|---|
| 1 - axle housing; | 2 - brake oil line; |
| 3 - axle; | 4 - planetary carrier; |
| 5 - planetary gear axle; | 6 - annular-oil cylinder; |
| 7 - annular piston; | 8 - brake drum; |
| 9 - ball; | 10 - push disc; |
| 11 - brake shoe; | 12 - mounting shell; |
| 13 - wheel drum; | 14 - braking cylinder; |
| 15 - piston; | 16 - brake-primary piston; |
| 17 - push rod; | 18 - annular-oil shell; |
| 19 - annulus; | 20 - planetary gear; |
| 21 - sun gear; | 22 - synchronization-locking ring; |
| 23 - engagement sleeve; | 24 - slide; |
| 25 - positioning steel ball; | 26 - spring; |

DETAILED DESCRIPTION OF THE PREFERRED EMBODIMENTS

As discussed in the background section, the prior art drum brakes operate by creating friction between a fixed component and a moving component. From the energy point of view, the braking process is a process where, through friction, the mechanical energy of the automobile is converted into heat energy and expanded. When the automobile brake is applied, the friction between the brake shoes and the brake drum creates heat energy, and the amount of the heat energy equals the mechanical energy converted in the process. The more mechanical energy is converted during a given time period, the less braking time and distance is required to stop an automobile. The fundamental reason is that the absolute value of the speed reduced during the braking period has been increased. In other words, given the same braking force, friction factor of the friction pads of the brake shoes and the typical dimensions for the typical brakes, if by changing the brake structure that the consumption of the mechanical energy during a given time period can be increased, the braking time and distance can be thereby reduced.

Therefore, based on this train of thought, the following double acting leading shoe brake of the present invention is taken as an example to further illustrate embodiments of the drum brake of this invention.

Figure 7A:
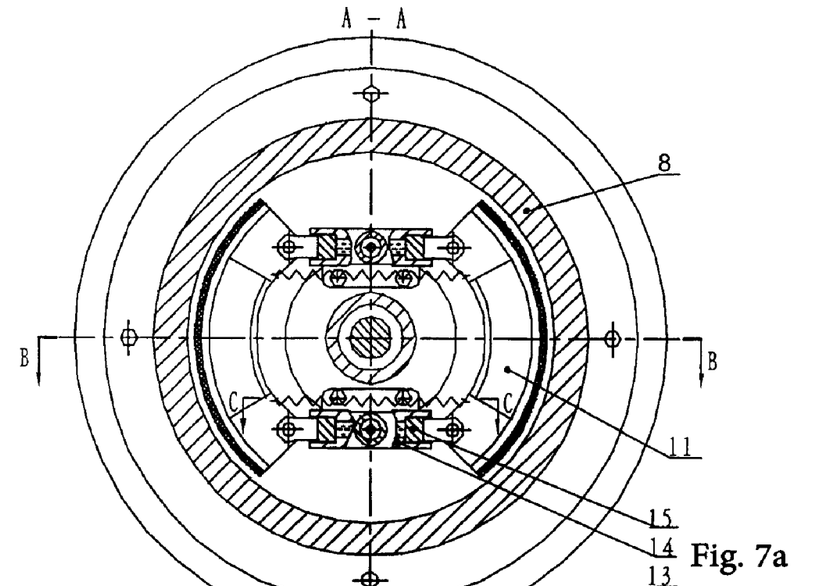
FIGS. 7a-7c are illustrations of an embodiment (Embodiment 1) of the brake of this invention.
Figure 7B:
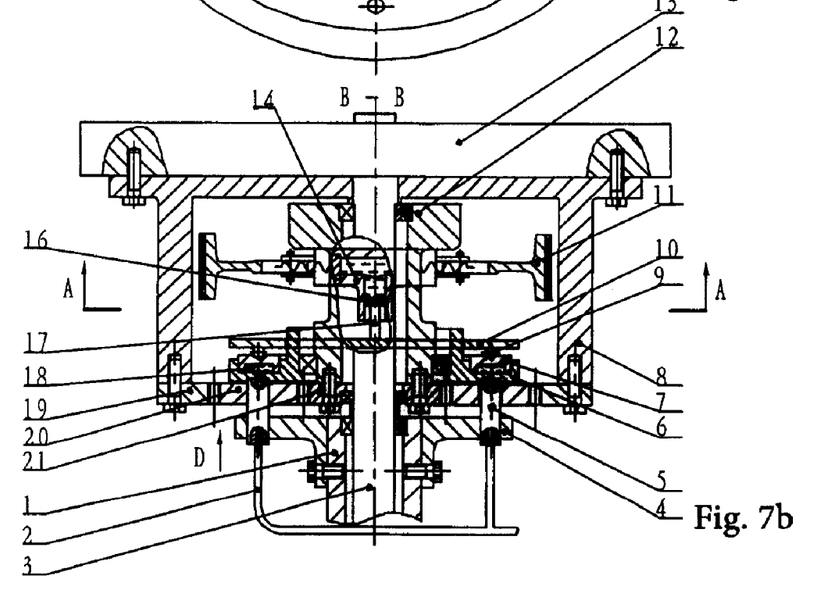
Figure 7C:
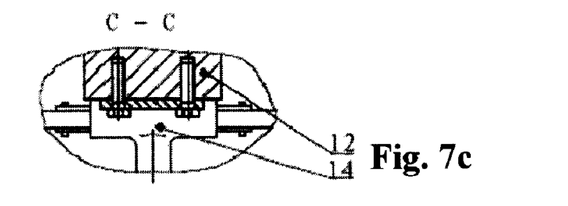
Figure 8:
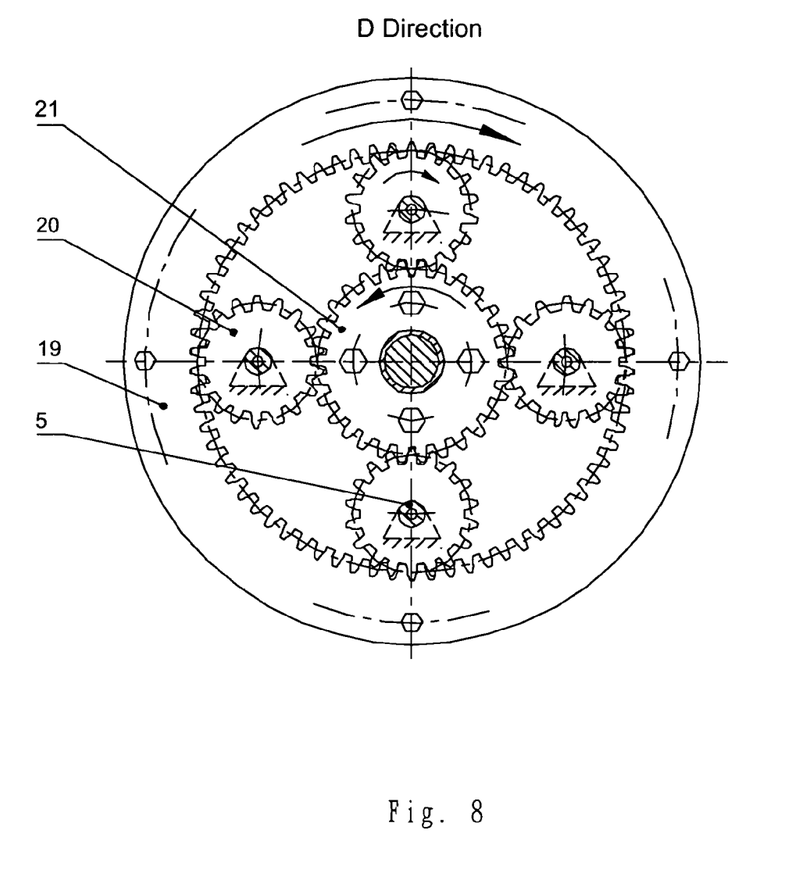
FIG. 8 is an illustration of the ordinary gear train of this invention.

FIGS. 7a-7c are illustrations of a first embodiment (Embodiment 1) of the drum brake of this invention. FIG. 8 is an illustration of the ordinary gear train used in FIGS. 7a-7c.

As shown in FIGS. 7a-7c, the automobile drum brake of this invention comprises a brake drum 8, a brake shoe 11, and a braking cylinder 14. In addition, the brake also comprises an ordinary gear train which comprises an annulus 19, a planetary gear 20 and a sun gear 21. Here, the annulus 19 is attached on the brake drum 8. The sun gear 19 and a mounting shell 12 of the brake shoe 11 are attached to each other. The planetary gear 20 is located between the annulus 19 and the sun gear 21, and a planetary gear axle 5 of the planetary gear 20 is affixed with a planetary carrier 4, e.g., being affixed on an axle housing 1.

When the drum brake for automobiles of this embodiment is compared to conventional drum brakes for automobiles, the main difference is the additional ordinary gear train. When the automobile brake is applied, the drum brake can make the brake shoe 11 turn in a direction opposite to the direction of rotation of the brake drum 8. Thus within the same amount of time more mechanical energy is consumed by friction, thereby distinctively shortening the braking time and distance. The following is a detailed illustration of the ordinary gear train and the brake drum having the ordinary gear train with references to FIGS. 7 and 8.

The ordinary gear train comprises an annulus 19, a planetary gear 20 and a sun gear 21. Here, the annulus 19 engages the planetary gear 20, the planetary 20 engages the sun gear 21 at the center, and the planetary gear 20 is relatively fixed. Therefore, as shown in FIG. 8, because of the planetary gear 8, the annulus 19 always rotates in a direction opposite to the direction of rotation of the sun gear 21. That is the key characteristic of this invention.

The annulus 19 is fixed on the brake drum 8, and moves in synchronization with the drum brake 8. As shown in FIG. 7b, the annulus 19 is fixed on the brake drum 8 using screws. However, various methods of available technology can be used, such as welding riveting, etc. Thus there is no limitation as to the method of fixation. When the words "fix," "affix," or "attach" appears in the illustration and claims below, it should be understood in the same way unless it is otherwise defined.

The sun gear 21 is attached on the mounting shell 12 of the brake shoe. The mounting shell 12 of the brake shoe and the braking cylinder 14 are attached to each other. The planetary gear 20 is located between the annulus 19 and the sun gear 21 and engages both. The planetary gear axle 5 of the planetary gear 20 is fixed with a planetary carrier 4 on an axle housing 1. Since the axle housing 1 is relatively fixed to the automobile, the planetary gear 20 is also relatively fixed to the automobile. That means the planetary gear can only turn on its axis and cannot revolve around the sun gear 21.

Therefore, by adopting the above mentioned design, when the automobile is moving in normal conditions, the annulus 19, the brake drum 8 and the wheel drum turn together. The planetary gear 20 is fixed on the axle housing 1 through the planetary gear axle 5 and the planetary carrier 4. Thus the position of the planetary gear 20 is fixed relative to the automobile (i.e., it can only turn on its axis and cannot revolve around the sun gear 21). The sun gear 21 is at the center of the ordinary gear train and fixed to the mounting shell 12. The sun gear 21 turn because the planetary gear 20 turns on its axis, and the direction is opposite to the direction of rotation of the annulus 19 (or the direction of rotation of the brake drum 8 and the wheel drum 13). Thus, the sun gear 21 drives the mounting shell 12, the brake shoe 11 and the braking cylinder 14 to turn in the same direction as it does. When braking is needed, the braking cylinder 14 drives the brake shoe 11 to expand and press against the inner surface of the cylinder of the brake drum 8. Since at this time the brake shoe 11 turns in a direction opposite to the direction of rotation of the brake drum 8, more mechanical energy can be consumed within a shorter period of time through friction, thereby distinctively shorten the braking time and distance of the automobile. That is especially useful during an emergency stop.

In the embodiment, since the annulus 19 and the brake drum 8 are directly attached together, when the automobile is traveling under normal conditions, the annulus 19 and the brake drum 8 rotate in a synchronized fashion. The planetary gear 20, the sun gear 21, the brake shoe 11, and the braking cylinder 14 all rotate together. Thus, there is unnecessary loss of energy. To avoid this disadvantage, this invention provides another embodiment. That is, the annulus 19 is attached on the brake drum 8 using an engagement sleeve and a synchronizer, instead of being attached on the brake drum 8 with screws. The following is a detailed illustration of that embodiment with references to FIGS. 9a-9c.

Figure 9A:
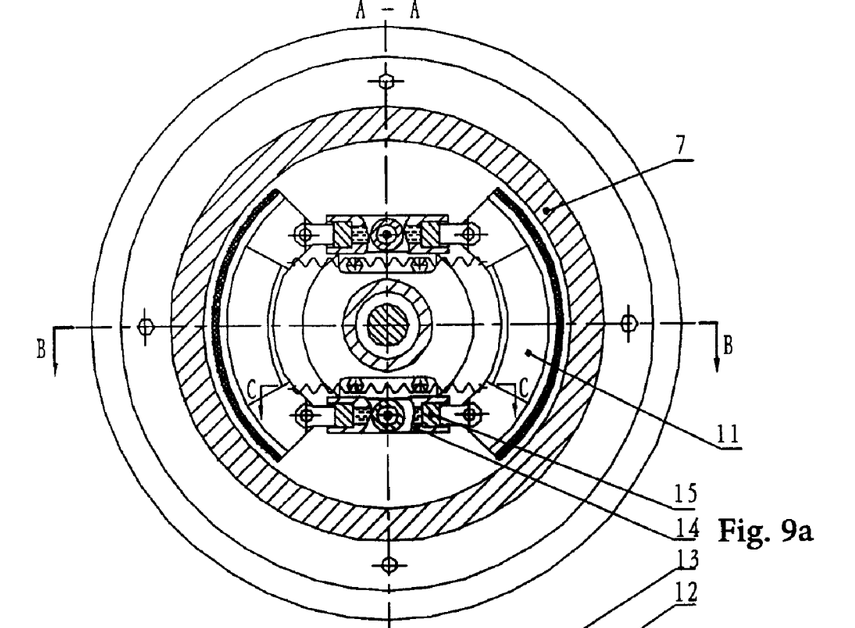
FIGS. 9a-9c are illustrations of another embodiment (Embodiment 2) of the brake of this invention.
Figure 9B:
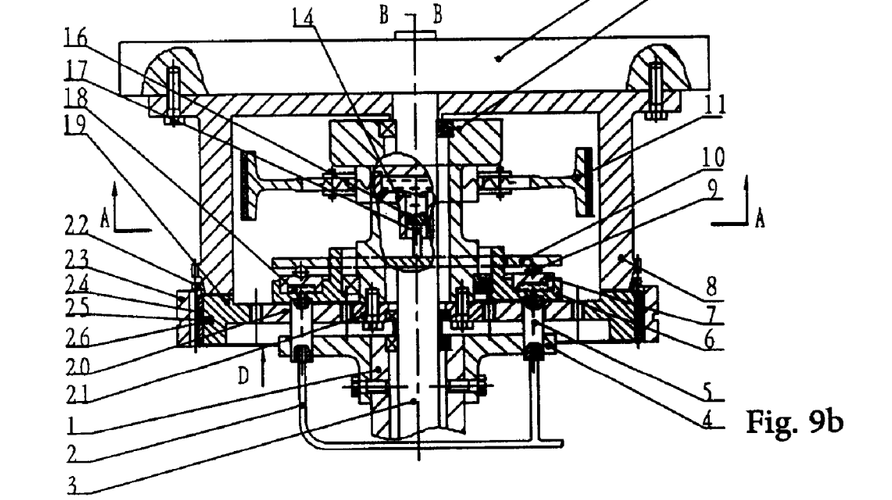
Figure 9C:
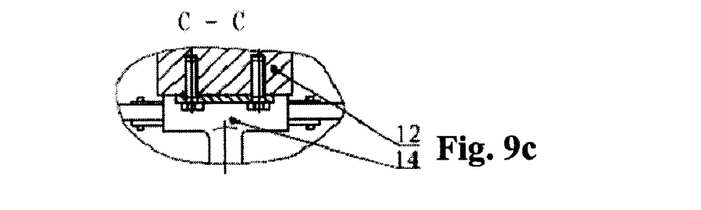

As shown in FIGS. 9a-9c, the second embodiment differs than the first embodiment in that the connection between the annulus 19 and the brake drum 8 is achieved using an engagement sleeve and a synchronizer. Engagement sleeves and synchronizers are widely used in gear-boxes of automobiles to reduce the shock between gears when the driver shifts the gear. The designs of engagement sleeves and synchronizers are provided in various publications on the structure of automobiles. For example, they are provided in the chapters regarding gear-boxes in "Automobile Structure" by Guan Wen-Da (Editor-in-Chief), Tsinghua University Press, September, 2004 (1st Edition). Therefore, FIGS. 9a-9c only provide an illustration instead of detailed figures.

As shown in FIG. 9b, compared to the first embodiment, the second embodiment does not have the screws attaching the annulus 19 and the brake drum 8 together. Instead, there is an engagement sleeve 23 and a synchronizer between the annulus 19 and the brake drum 8. The synchronizer comprises a synchronizing coupler 22, a slide 24, a positioning steel ball 25, a positioning spring 26, etc. There are teeth located on the outer rim of the annulus 19 which persistently engage the inner teeth of the engagement sleeve 23. There are also teeth on the outer surface of the brake drum 8. Thus when the automobile brake is applied the engagement sleeve slides along the axle. Under the effect of the synchronizer, the inner teeth of the engagement sleeve 23, rapidly engage the outer teeth of the brake drum 8. Thereafter the engagement sleeve 23 attaches to the annulus 19 and the brake drum 8 together, having the securing effect of screws. Then the automobile is braked under the effect of the driving cylinder. Compared to the first embodiment, the ordinary gear train, the brake shoe 11, etc. do not rotate until the automobile brake is applied, thereby reducing the energy loss due to the rotation of the ordinary gear train and the brake shoe 11 before the automobile brake is applied. Thus this design results to energy saving.

Also shown in FIGS. 7a-7c, since an ordinary gear train is added to the existing brake, a suitable design for driving the brake can be chosen based on the specific structure of the ordinary gear train. On the other hand, the object of this invention can also be achieved without changing the current design for the driving mechanism of the brake. The following is a description of the operation of a preferred embodiment in operating the brake.

A braking oil line 2 is inserted in the central hole of the planetary gear axle 5. The other end of the braking oil line 2 is connected to the main braking cylinder (not shown in the figure) outside of the brake. The end of the planetary gear axle 5 is inserted in an annular-oil cylinder 6. Since the planetary gear axle 5 is fixed to the axle housing 1 through a planetary carrier 4, the annular-oil cylinder 6 is also attached relative to the planetary gear axle 5. An annular-oil cylinder 6 and an annular piston 7 form an annular-oil shell 18. Meanwhile, the annular piston 7, the ball 9, and the push disc 10 form a radial bearing. Push disc 10 and a brake-primary piston 16 are connected with a push rod 17. The braking cylinder 14 is a tee-wheel braking cylinder.

By adopting the above design, when the automobile brake is applied, the hydraulic pressure reaches the annular-oil shell 18 through the main braking cylinder (not shown in the figure), the braking oil line 2 and the planetary gear axle 5. The hydraulic pressure pushes the annular piston 7 to move. The force is then passed on to the brake-primary piston 16 through the ball 9, the push disc 10, and the wheel drum 13. The brake-primary piston 16 converts the mechanical force to hydraulic pressure through the tee-wheel braking cylinder 14, thereby pushing the piston 15 of the braking cylinder 14 to push the brake shoe 11. The brake shoe 11 expands outwards and presses against the inner surface of the brake drum 8, applying friction on the brake drum 8. The mechanical energy of the automobile is consumed in the form of friction heat energy to bring the automobile to a stop.

In the braking process, the brake drum 8 rotates with wheel drum 13, and the brake shoe 11 rotates in an opposite direction because of the ordinary gear train. Therefore, the relative sliding speed between the brake shoe 11 and the brake drum 8 is a lot greater than that of a conventional brake. In other words, the absolute value of its braking deceleration is significantly greater than that of a conventional brake. For example, when the number of teeth of the annulus 19 is three times of the number of teeth of the sun gear 21, the relative sliding speed between the brake drum 8 and brake shoe 11 is also increased by three times, and the mechanical energy consumed in a time unit by the brake is also increased by three times. In other words, the absolute value of the braking deceleration has significantly increased. Thus the brake of this invention can effectively reduce the braking time and distance.

The above is a detailed description of the embodiments of the drum brakes of this invention. The described embodiments have double acting leading shoe brakes as examples (as shown in FIG. 7 and FIG. 9). However, as indicated above, the ordinary gear train of this invention can be used in various types of drum brakes. For the purpose of simplicity, there is no description of other embodiments applying various other types of brakes. It shall also be understood that drum brakes can be applied to any type of vehicles not limited to automobiles.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

I claim:

1. A drum brake, comprising:
   a brake drum rotating in a first direction;
   one or more brake shoes; and
   wherein when said drum brake is applied, said one or more brake shoes are caused to rotate in a direction opposite of said first direction and said one or more brake shoes engage with said brake drum to bring said brake drum to a stop
   wherein the brake further comprises a brake-oil hose, an annular-oil cylinder, an annular piston, a push disc, a push rod, and a brake-primary piston; wherein an end of the brake-oil hose is inserted in the central hole of a planetary gear axle of a planetary gear; an end of the planetary gear axle is inserted in the annular-oil cylinder; an annular-oil shell is formed between the annular-oil cylinder and the annular piston and is connected to the central hole of the planetary gear axle; the annular piston is connected to the push disc; the push disc is connected to an end of the push rod; and the other end of the push rod is connected to the brake-primary piston.

2. The drum brake of claim 1, further comprising an ordinary gear train, said ordinary gear train having an annulus, one or more planetary gears, and a sun gear;
   said ordinary gear train causing said brake shoes to rotate in the direction opposite of said first direction; and
   wherein the annulus is attached to said brake drum; the sun gear is connected to said one or more brake shoes; and the one or more planetary gears are located between the annulus and the sun gear.

3. The drum brake of claim 2 wherein in operation said annulus has inner teeth interacting with said one or more planetary gears, said planetary gears having teeth interacting with said sun gear, and resulting in said one or more brake shoes to rotate in a direction opposite that of the first direction.

4. The drum brake of claim 2 wherein the annulus is attached to said brake drum with a screw.

5. The drum brake of claim 2 wherein the annulus is attached to said brake drum with an engagement sleeve and a synchronizer.

6. The drum brake of claim 1 wherein a ball is located between said annular piston and said push disc.

7. The drum brake of claim 1, further comprising,
   a braking cylinder; wherein said braking cylinder is attached to one or more mounting shells of said one or more brake shoes.

8. The drum brake of claim 7 wherein said braking cylinder is a tee-braking cylinder.

* * * * *